UNITED STATES PATENT OFFICE.

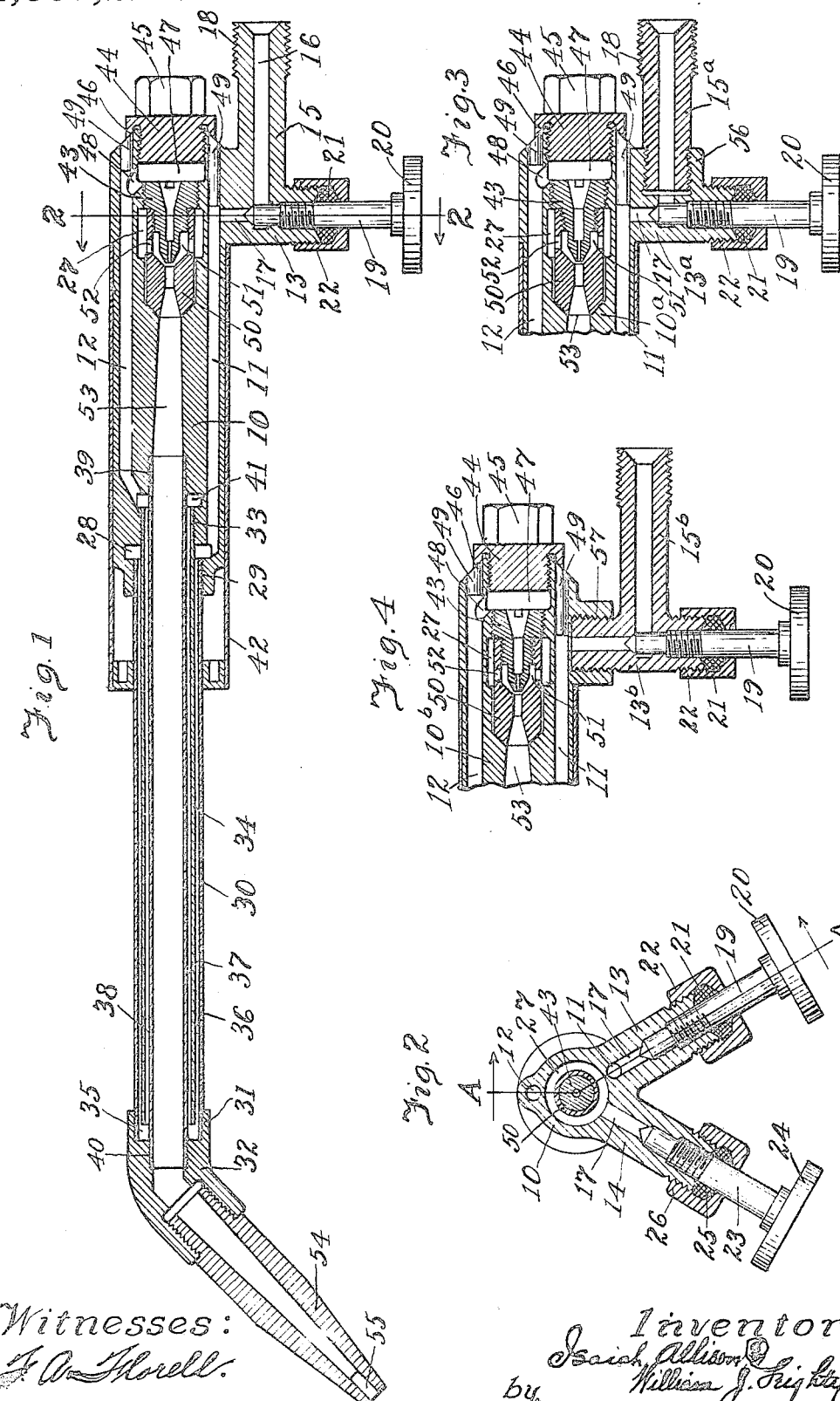

ISAIAH ALLISON, OF DOWNERS GROVE, AND WILLIAM J. LEIGHTY, OF CHICAGO, ILLINOIS.

OXYACETYLENE-BLOWPIPE.

1,384,224.  Specification of Letters Patent.  Patented July 12, 1921.

Application filed February 20, 1919. Serial No. 278,222.

*To all whom it may concern:*

Be it known that we, ISAIAH ALLISON and WILLIAM J. LEIGHTY, citizens of the United States, and residents of Downers Grove and Chicago, respectively, in the county of Cook and State of Illinois, have invented certain new and useful Improvements in Oxyacetylene-Blowpipes, of which the following is a description, reference being had to the accompanying drawing, which forms a part of our specification.

Our invention relates to blowpipes or burners adapted to employ oxygen and acetylene for welding purposes; and has for its object the provision of a construction which is simple and economical and therefore easy to manufacture, and in which the making of any necessary repairs or replacements will be greatly facilitated; while at the same time providing a construction which will prevent any "flash back" by not allowing the mixed gases to become overheated within the plowpipe during the welding operation.

One object of our invention is to provide a blowpipe formed so as to permit the use of a cooling medium whereby the body portion and welding head of the blowpipe will be kept as nearly normal in temperature as possible; and at the same time provide a blowpipe that will be "universal", that is to say, a blowpipe which will operate as successfully with low pressure as well as high pressure acetylene.

A further object of our invention is to provide a blowpipe provided with an injector which will carry the oxygen through a velocity jet in such a manner as to cause the necessary amount of acetylene to be entrained or drawn into what is known as the combining or mixing tube and thereby provide a perfect combustible mixture.

Another object of our invention is to provide a blowpipe wherein the injector and combining or mixing tube is located in the handle portion of the blowpipe at a point removed or as far distant from the tip, and therefore also from the welding heat, as possible, so as to keep the acetylene from becoming heated by the welding flame; the construction therefore enabling the maintenance of a normal welding mixture of the gases, regardless of the duration of operation or intensity of heat encountered in the welding process.

A further object of our invention is to provide a blowpipe wherein the injector in the rear head of the blowpipe, namely in the body or handle, as well as the outer nozzle or tip, may be readily removed and replaced so as to adapt the blowpipe to different conditions or work; while the respective elements of the blowpipe are so constructed and united that the same will not only be economical in manufacture but may also be readily combined and made accessible for the purposes of repair and replacement.

The above enumerated objects and advantages, as well as others inherent in the construction and its modifications, will be more fully comprehended from the following detailed description of the accompanying drawing, wherein:—

Figure 1 is a longitudinal sectional view of our improved blowpipe taken on the line A—A of Fig. 2 looking in the direction of the arrows.

Fig. 2 is a cross-sectional view of the rear head portion of our improved blowpipe taken substantially along the line 2—2 of Fig. 1 and looking in the direction of the arrows.

Fig. 3 is a detail sectional view of the rear head portion or body of the blow-pipe, substantially along a line similar to A—A of Fig. 1, illustrating a modified form.

Fig. 4 is a detail sectional view similar to Fig. 3, illustrating another modified form of our invention.

The exemplification shown in the drawing we believe to be the simplest and best adaptations of our invention, but the invention may have expression in somewhat different mechanical form without departing from the spirit of the invention which is set forth in the claims appended hereto.

In the construction as illustrated in the first two figures of our drawing, the main or body portion, which also constitutes the handle, comprises a suitable metallic casting 10 of sufficient density in order to permit the casting to be provided with fluid-tight passages adapted to properly convey the gases of combustion employed in the operation of the blowpipe. The casting or body portion 10 is shown provided with the longitudinally disposed passages 11 and 12, preferably formed on opposite sides of the longitudinal center line of the casting so as to provide independent, non-communicating gas-passages. The casting or body portion 10 is also provided with extensions 13 and 14, formed preferably integral therewith and disposed in an angular manner therefrom, as more clearly shown in Fig. 2. Each of the extensions 13 and 14 is provided with a substantially similar stem portion 15 (the stem portion to projection 14 not being shown) having a longitudinal passage 16 adapted to intersect a passage 17 in the respective projections 13 and 14. The outer ends of both stem portions 15 are preferably threaded as shown at 18 in Fig. 1, to enable suitable hose connections to be made therewith through the medium of suitable nuts and sleeves, as is the usual practice. The passage 17 in extension 13 is provided with a suitable needle valve 19 shown threaded therein; the needle valve controlling the communication between passage 16 and passage 17 and being operable by means of hand-wheel 20. Gas-tight connection about the stem of the needle valve 19 is formed by means of suitable packing 21 and gland nut 22 which is threaded onto extension 13. Extension 14, like extension 13 has its passage 17 also provided with a suitable needle-valve 23 adapted to control the communication between a similar passage 16 in its stem portion 15 (not shown) with the passage 17; the needle-valve 23 being controlled by means of hand-wheel 24; while a gas-tight connection is formed by means of suitable packing 25 and gland-nut 26 which is shown threaded on the projection or extension 14, see Fig. 2. The stem portion 15 of projection 13 is adapted to have a connection, in any suitable manner, with a suitable oxygen supply; while the stem 15 (not shown) of projection 14 is intended to have connection, by any proper means, with a suitable acetylene supply.

As is evident from the construction shown and described, the extent of communication between the two sets of passages 16 and 17, and therefore the flow of different gases, may be controlled by the respective needle-valves 19 and 23. The passage 17 of extension 13 communicates with passage 11 in the casting or body portion 10; while the passage 17 of extension 14 communicates with an annular passage or chamber 27 formed in the main casting or body portion 10.

The passage 11 terminates in an annular passage or chamber 28, see Fig. 1, formed at the inner end of the main casting 10. This end of casting 10 is shown provided with a threaded orifice at 29 to receive a tubular member 30; the opposite end of the tubular member 30 having a suitable gas-tight connection at 31 with the head 32. The orifice at the inner end of the main casting or body portion 10 is reduced at a point removed from the outer end and is threaded as shown at 33, to receive the threaded end of an intermediate tubular member 34, which is of somewhat less length than tubular member 30, so as to provide an annular chamber 35 in the head 32; which chamber is arranged in communication with a passage 36 intermediate of outer tubular member 30 and inner tubular member 34 and also with a passage 37 disposed intermediate of the intermediate tubular member 34 and the inner tubular member 38. The orifice at the inner end of the casting or main body portion 10 is stepped or further reduced and threaded so as to receive the end of the inner tubular member 38, as shown at 39; while the opposite end of tubular member 38 extends beyond the chamber 35 in head 32 and is threaded into the passage in the head, as shown at 40.

The inner end of casting 10, at a point intermediate of annular passage or chamber 28 and the point of connection 39 of inner tube 38 therewith, is provided with an annular chamber 41. This chamber 41 communicates with the passage 12 in the casting 10. The casting 10 is preferably provided with an outer shell or brass tube 42 secured thereto so as to provide a suitable handle for the blowpipe.

The outer end of casting 10 is bored to receive a suitable injector tube 43 shown threaded into casting 10 so as to provide a gas-tight connection; and the immediate outer end of casting 10 is shown provided with a suitable plug 44 having nut portion 45; the plug 44 being shown with an overlapping beveled portion or shoulder corresponding with the taper or bevel of the casting 10 so that a conical seat is provided, as at 45, whereby a fluid or gas-tight connection or closure for the passages in the upper end of casting 10 is provided. The plug 44 is formed so as to leave a space or chamber 47 intermediate of the inner end of the plug and injector-tube 43; this chamber 47 in turn communicates with passage 12 by means of port 48.

In constructing the casting 10 with the longitudinal passages 11 and 12, the latter are bored from what may be termed the outer end of casting 10, and the outer ends of both passages 11 and 12 are then closed by means of suitable pins or plugs as at 49, 49 which are preferably overlapped by the shoulder on plug 44, see Fig. 1.

The injector tube 43 is shown threaded at a point slightly removed from its inner end or tip, to receive an inner or combining tube 50. The tube 50 is formed so as to provide a chamber 51 about the tip portion of injector tube 43; and the chamber 51 has communication with the annular chamber 27, surrounding the end of tube 50, by means of ports 52.

The combining tube 50 has a gradually increasing passage therethrough which communicates with an expansion passage 53 formed at the longitudinal center line of casting 10; and the expansion passage 53 in turn communicates with the inner tube 38 whereby the combined gases, when both oxygen and acetylene are used, are delivered to head 32.

Head 32 is shown threaded to receive a suitable tip or nozzle 54 provided with a suitable orifice 55 whereby the gases are conveyed to the atmosphere and at which point combustion takes place to form the welding flame.

As is apparent from the construction shown and described, the acetylene gas, from a suitable source of supply, is permitted to enter passage 17 of projection 14 when needle-valve 23 has been properly operated. This allows the acetylene to enter the annular chamber or passage 27 and, by means of ports or openings 52, permits it to enter chamber 51 which is disposed about the inner tip portion of injector tube 43, to-wit the chamber formed in the mixing tube 50. The oxygen, from a suitable source of supply, flows through passage 16, of extension 15, into passage 17, of projection 13, when needle valve 19 has been opened; the oxygen then flowing from passage 17 into longitudinal passage 11 in casting 10; thence into annular chamber 28 which communicates with the passage 36 intermediate of outer tube 30 and intermediate tube 34. The oxygen flowing through passage 36 enters annular passage 35 and is caused to pass back in reverse direction through the passage 37, intermediate of the inner tube 38 and intermediate tube 34; and from passage 37 it is conveyed into annular passage 41, which in turn conveys the oxygen into longitudinal passage 12, from whence the oxygen, by means of port 48, is conveyed into chamber 47 and thence through injector-tube 43.

As is apparent from the construction shown and described, namely with the injector and combining or mixing tube located in the handle portion of the blowpipe, namely at a point as far distant from the welding heat as possible, the acetylene will be prevented from becoming heated by the welding flame, with the result that we are enabled to maintain a normal welding mixture of the gases regardless of the duration or length of time of operation or the intensity of heat encountered during the welding process. The importance of this condition will be more readily appreciated when it is understood that acetylene gas expands much more rapidly with heat than oxygen gas so that when both are equally heated the combustible mixture will not remain normal, or of the nature required to produce a neutral flame, which is an objectionable condition encountered in blowpipes where the combining tubes are located in the welding head of the blowpipe. In order to enable the proper continuous operation of the blowpipe, it is necessary to combine the proper neutral mixture of the gases at a normal temperature and also maintain that temperature as far as possible during the welding operation and for that reason it is essential to provide a mixing chamber or passage at a distance removed from the nozzle or blowpipe tip; in other words at a distance removed from the welding flame; because if the gases become heated, prior to their discharge into the nozzle or tip of the blowpipe, the relative proportion of acetylene to oxygen is altered and less acetylene admitted, due to its greater expansion, with the result that the combustible mixture will consist of too much oxygen, thereby resulting in an oxidizing flame. With our improved construction, these difficulties are obviated because of the placing of the injector and combining or mixing tube or chamber as far removed from the welding head as possible; and also by reason of our improved construction wherein the combustible mixture is cooled throughout its course from the rear head or handle end of the blowpipe to the welding head and the nozzle or tip thereof.

In Fig. 3 we illustrate a slight modification of our blowpipe, in that the main casting 10$^a$ of the handle portion is provided with the projection 13$^a$ formed integral therewith as in the construction shown in Fig. 1, while the stem portion 15$^a$ is shown removably secured in the projection 13$^a$ instead of being formed integral therewith as in the construction in Fig. 1. The extension or stem portion 15$^a$ is shown suitably threaded at 56 to enable a suitable gas-tight connection being formed with the gas-supply. In this construction the injector 43 and combining tube 50 are similar in construction and arrangement to that previously described, as are also all of the gas passages; while the admission of the gases are controlled by similar needle-valves as shown and described.

In Fig. 4 we show another modification, wherein the extension 13$^b$, instead of being made integral with the main casting 10$^b$, (which is provided with similar gas passages as casting 10) is a separate element or member and provided with a threaded or "sweated" connection at 57 with the main casting portion 10$^b$; the extension 13$^b$ being provided with an integral stem portion 15$^b$, which, in that respect is similar to Fig. 1, except, of course, that the stem portion 15$^b$ is not integral with the main casting portion 10$^b$ but with extension 13$^b$, as shown. The remaining details of the blowpipe are intended to be similar to the construction shown in Figs. 1 and 2; and it will be understood that a pair of similar projections 13$^a$ or 13$^b$ are employed; the one connecting with an oxygen gas supply while the other has connection with an acetylene gas supply.

We prefer to employ the plug or cap construction shown at 44, provided with the conical seat, because of the fact that a fluid or gas-tight joint is thereby provided with a nominal amount of pressure; and the construction of injector and combining tube or member enables fluid-tight relations to be formed with the main casting or body portion 10 at the inner end of the combining tube by reason of the threaded connection between the injector and the main or body portion. The construction also enables ready replacement of the injector and combining tube or mixing member by an injector or combining tube having ports commensurate with the amount of gas required for the desired size of welding flame; the various parts being easily accessible for repair or replacement; while at the same time the nozzle or tip 54 may also be quickly replaced to suit the different sized welding flame desired.

Having thus fully described our invention and certain modifications, what we wish to secure by Letters Patent is:—

1. In a blowpipe of the class described, a handle portion comprising a main casting having a gas passage disposed lengthwise therein, a gas chamber at the rear end of said handle portion, inlet connections extending from the side of the handle portion and communicating with said gas passage and said gas chamber respectively, an expansion passage disposed longitudinally through the casting, the gas passage terminating at the rear end of the casting, a combined injector and mixing tube removably secured in the rear end of the expansion passage in the casting and intermediate of said gas passage, gas chamber and said expansion passage, and removable closure means for the rear end of said casting whereby access to the combined injector and mixing tube may be had without removing said inlet connections.

2. A blowpipe of the class described, comprising a handle portion provided with gas passages and an expansion passage, valved connections secured to said handle portion for controlling the gas supplies to said passages, means disposed about said expansion passage whereby one of the gases is forced to flow in a reverse direction lengthwise of and about said expansion passage to act as a cooling medium, an injector and a combining tube removably secured in said handle portion intermediate of the valved connections and said gas passages, and removable closure means at the rear end of said handle portion whereby access to the injector and combining tube may be had without affecting the valved connections.

3. A blowpipe of the class described, comprising a handle portion provided with a main casting having a plurality of gas-tight passages and an expansion passage disposed longitudinally therein, a conveying tube communicating with said expansion passage, means secured to said handle portion and disposed about said conveying tube and communicating with certain of the gas-passages in said casting whereby one of the gases is conveyed lengthwise of said conveying tube and about the same so as to act as a cooling medium, and an injector secured in the rear end of said handle portion intermediate of the gas passages and said expansion passage.

4. A blowpipe, comprising a handle portion provided with gas-passages and an expansion passage, valved connections secured to said handle portion for controlling the gas supplies to said passages, a conveying tube communicating with said expansion passage for conveying the combined gases to the point of combustion, a pair of concentric tubes disposed about the conveying tube, said pair of concentric tubes being arranged to establish communication at one of the ends between the two concentric tubes, while the opposite ends of said tubes have communication with the different gas passages in said handle portion, whereby one of the gases is caused to flow lengthwise of the conveying tube and in a reverse direction, and an injector removably secured in the rear end of the handle portion intermediate of the gas passages and said expansion passage.

5. A blowpipe of the class described, comprising a handle portion consisting of a main casting having gas passages and an expansion passage disposed longitudinally of the casting and extending to the rear end of the casting so as to be accessible from said end, an injector and a mixing tube removably secured together, with the injector removably secured in the rear end of the expansion passage, the rear end of the expansion passage being formed to provide a chamber about the inner or tip end of said injector, removable closure means for the rear end of the gas passages in said casting, valved inlets secured to the side of the casting whereby the gases are conveyed, respectively, to one of said gas passages and to said chamber disposed about the inner end of said injector, and a conveyer tube removably secured to one end of said casting and communicating with said expansion passage, the opposite end of said conveyer tube being provided with a nozzle or tip-receiving head.

6. A blowpipe of the class described, comprising a nozzle or tip-receiving head, a handle portion, a gas-conveying tube intermediate of the handle portion and said head, the handle portion being provided with longitudinally disposed passages and annular passages or chambers, one of said longitudinal passages constituting an expansion passage, while the annular passages or chambers effect communication between certain of the longitudinally disposed passages; valved extensions secured to the side of the handle portion, adapted to receive gases from different sources of supply, one of the valved extensions communicating with one of the longitudinally disposed gas passages, while the other valved extension communicates with one of the annular passages or chambers, an ejector removably secured in the rear end of one of the longitudinal passages and in communication with one of the annular passages or chambers, a mixing tube removably secured to said injector and provided with ports in its side walls about the tip of the injector to establish communication with the annular passage which communicates with one of said valved extensions.

7. A blowpipe of the class described, comprising a head provided with a removable tip or nozzle, a handle portion, a gas-conveying tube intermediate of the handle portion and said head, a pair of concentric tubes disposed about said gas-conveying tube, an annular chamber in said head for establishing communication between said concentric tubes, the handle portion being provided with longitudinally disposed gas passages and annular gas passages, each annular gas passage having communication with one of the longitudinally disposed passages, while each of the concentric tubes has communication at the rear end with one of the annular passages, whereby one of the gases flowing through one of the longitudinally disposed passages and one of said annular passages is forced to flow lengthwise of said conveying-tube through the concentric tubes and be discharged into a second longitudinally disposed gas passage in the handle portion, an injector removably secured in said rear end of said handle portion, a mixing tube removably secured to said injector, and extensions secured to the rear end of said handle portion and provided with valve controlled passages, said extensions being adapted to have connection with different gas supplies.

8. A blowpipe having a nozzle or tip-receiving head and a handle portion, the latter being provided with valved connections for admitting the different gases into the rear end of said handle portion, a gas-conveying conduit intermediate of the handle portion and said head, and means whereby one of the gases is conveyed in a reverse direction from the rear end of the handle portion lengthwise of said conduit so as to constitute a cooling medium.

9. A blowpipe, comprising a tip or nozzle receiving head, a handle portion, a gas-conveying conduit intermediate of the handle portion and said head, valved connections secured to the rear end of said handle portion, gas passages whereby one of the gases is conveyed lengthwise of the handle and said gas-conveying conduit to act as a cooling medium and be returned to the rear end of said handle portion, an injector secured in the rear end of the handle portion and in communication with one of the gas passages, and a mixing tube removably secured to said injector and in communication with the other gas passage.

10. In a blowpipe of the class described, a plurality of gas passages and a mixed gas-conveying passage, an injector disposed intermediate of the gas passages and the conveying passage, and means whereby one of the gases is made to flow about and lengthwise of the conveying passage before delivery to said injector, to act as a cooling medium.

11. In a blowpipe of the class described, a handle portion provided with gas passages and with a conveying tube for conveying the combustible mixture to the point of combustion, removable valved gas inlets secured to the rear end of said handle portion and in communication with different gas passages therein, a removable injector secured in the rear end of said handle portion, a combining tube removably secured to the inner end of the injector, and removable closure means secured to the rear end of the handle portion for permitting access to said injector and mixing tube.

12. A blowpipe, comprising a tip or nozzle receiving head, a handle portion, a gas-conveying conduit intermediate of the handle portion and said head, valved connections secured to the rear end of said handle portion, gas passages whereby one of the gases is conveyed lengthwise of the handle and said gas-conveying conduit to act as a cooling medium and be returned to the rear end of said handle portion, an injector secured in the rear end of the handle portion and in communication with one of the gas passages, a mixing tube removably secured to said injector and in communication with the other gas passage, and removable means for closing the rear end of said handle portion whereby access to the injector, mixing tube and gas passage may be had.

13. In a blowpipe of the class described, a handle portion comprising a casting provided with longitudinal passages and annular passages arranged at the ends of the longitudinal passages, a pair of valved inlets secured to the sides of the casting and arranged in communication with one of the longitudinal passages and one of the annular passages, the longitudinal passages all terminating at the rear end of the casting with one of the longitudinal passages enlarged at the rear end, a mixing tube and an injector removably secured together at the tip end of said injector while the injector is removably secured in the rear end of said last mentioned longitudinal passage, and a closure member removably secured in the rear end of said casting so as to provide a gas chamber intermediate of said closure member and the rear end of the injector.

ISAIAH ALLISON.
WILLIAM J. LEIGHTY.

Witnesses:
GEORGE HEIDMAN,
F. A. FLORELL.